United States Patent Office 3,348,284
Patented Oct. 24, 1967

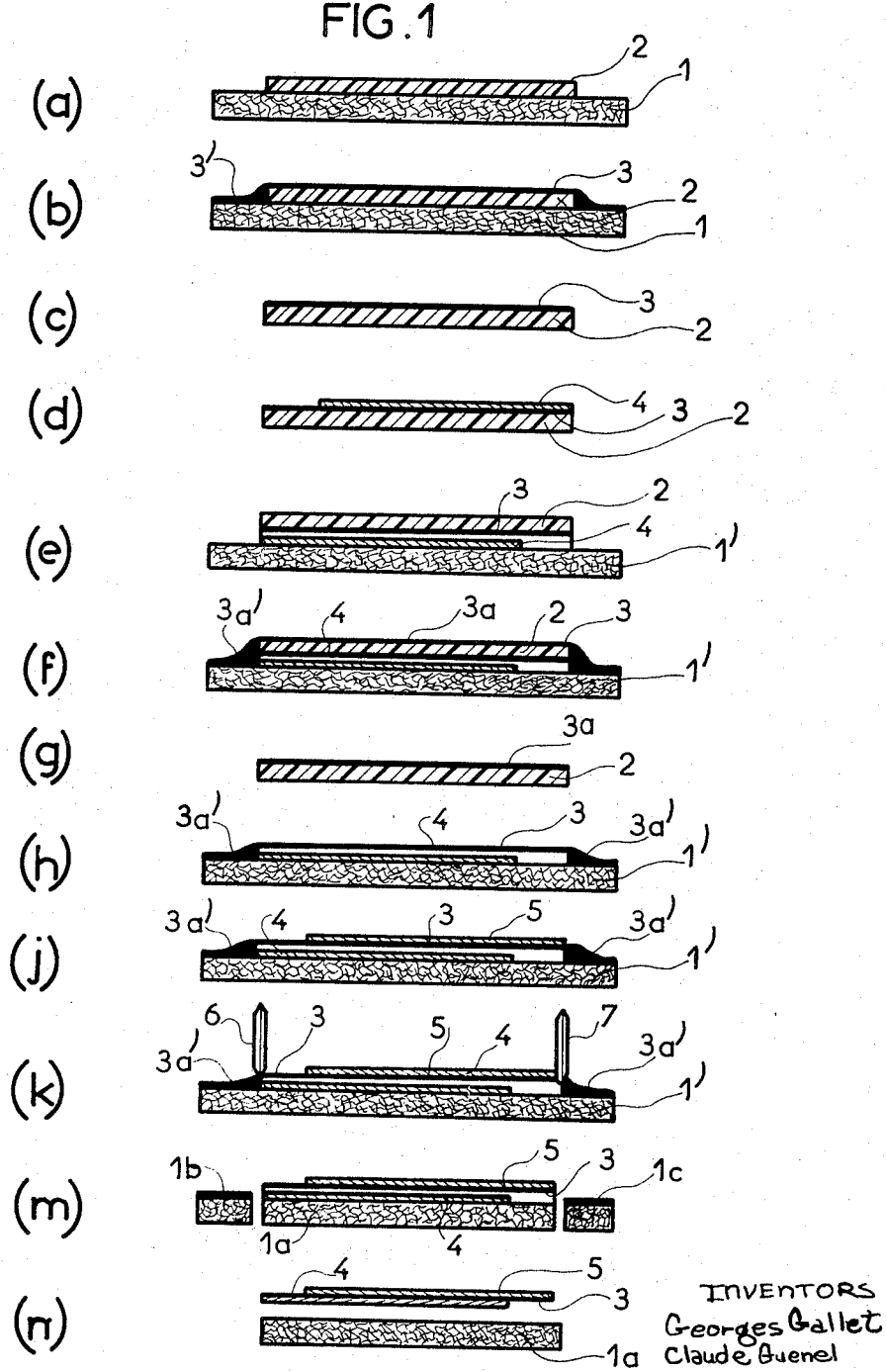

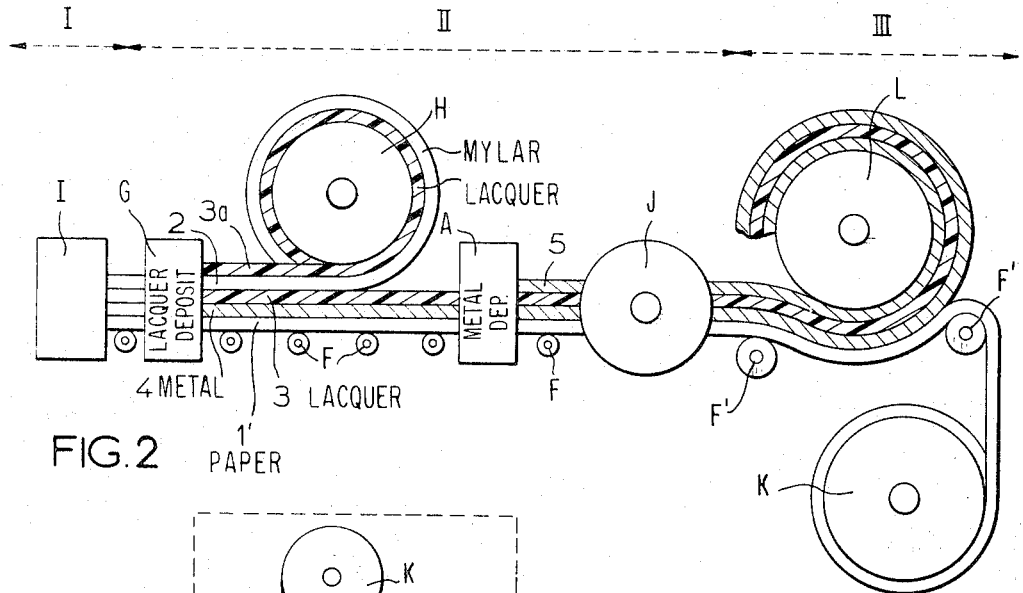
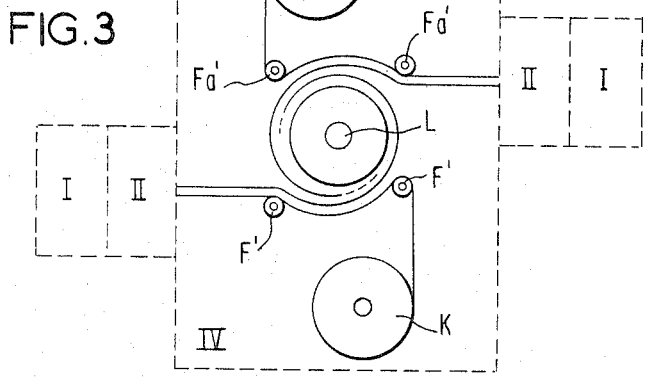
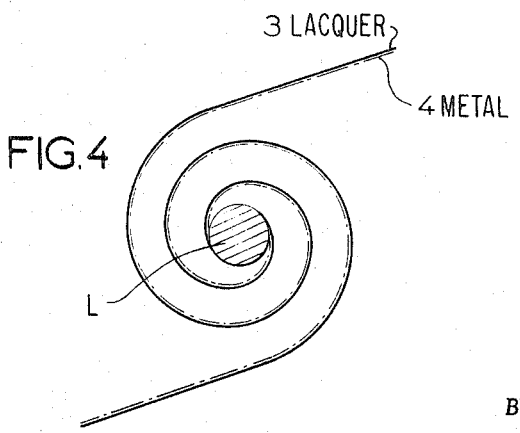
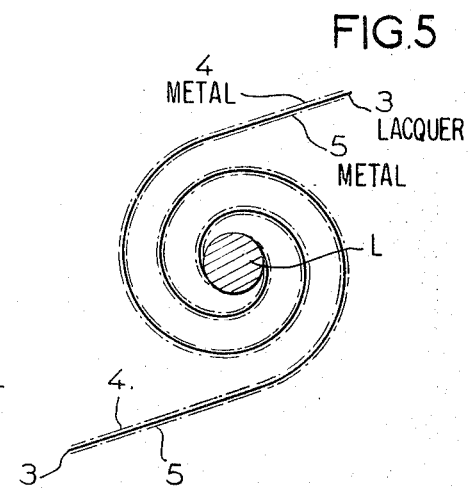

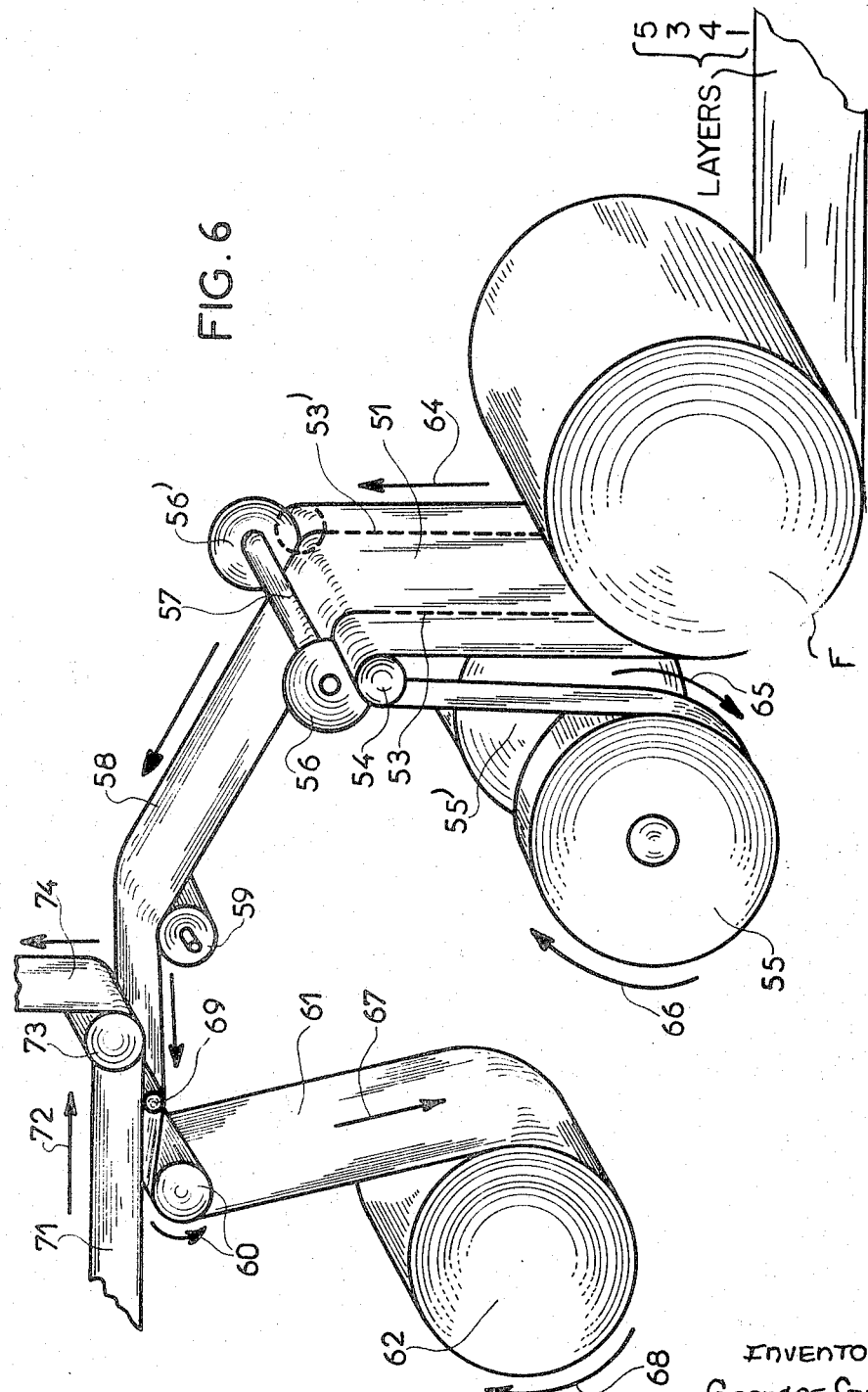

3,348,284
METHOD FOR MANUFACTURING METAL COATED BANDS
Georges Gallet, La Celle-Saint-Cloud, and Claude Guenel, Pantin, France, assignors to Compagnie General d'Electricite, Paris, France
Filed Mar. 23, 1965, Ser. No. 442,101
18 Claims. (Cl. 29—25.42)

ABSTRACT OF THE DISCLOSURE

Method of manufacturing ultra-thin insulating bands having at least one metallic layer coating, the bands being especially adapted for use in making wound capacitors. The method comprises coating one side of a first insulating band with a lacquer layer and depositing a metallic layer on the lacquer layer, applying the resultant band, metal face down, upon a second insulating band made of a material having high adherence characteristics with the lacquer, securing the lateral edges of the lacquer layer to the lateral edges of the second band, the metallic layer being in contact with the second band, removing the first insulating band (the lacquer layer remaining attached to the second band), and then removing the second band. A second metallic layer may be deposited on the outer side of the lacquer layer after the removal of the first band, if desired. In order to avoid mechanical strain in the composite first band (including the lacquer and metallic layers), it is advantageously wound on a reel while removing the second band, the reel being closely adjacent to the separation line between the composite first band and the second band. Preferably, the first band is made of polyethylene terephthalate and the second band of paper. The lacquer is preferably a polycarbonate.

---

The invention relates to a process for manufacturing extremely thin dielectric bands having a metallic coating on at least one of their faces. This invention relates also to an apparatus for performing a continuous manufacture of such bands according to the above-mentioned process, to a combination of such apparatus for manufacturing coiled type condensers and to condensers produced by such a combination of apparatus.

The metal-coated strips used for manufacturing wound capacitors are often made up of paper, ethylene glycol polyterephthalate (or "Mylar") or diphenol polycarbonates with a minimum thickness of the order of four microns. In the prior art, use is also made of thinner strips, referred to as "ultra-thin," with a thickness smaller than two microns, made, for instance, of polycarbonates which are metal coated on one face. Due to the thinness of such strips, their fragility is such that special precautions are required when using them for the making of wound capacitors. For instance, the winding force may be applied, as is known, to a thicker auxiliary strip which serves as a support for the ultra-thin strip, which comes off the support and is wound on a mandrel.

Another object of the present invention is to provide improved ultra-thin metal-coated strip coiled on a reel without applying any stress on the strip which will therefore have a perfect structure.

Another object of the present invention is to provide an apparatus for continuous manufacture of the above-mentioned strip coiled on a reel.

A further object of the invention is to provide an improved machine for manufacturing coiled-type condensers comprising an ultra-thin metal-coated strip having a perfectly regular structure.

A still further object of the present invention is to provide a condenser having a particularly high capacitance per unit volume and exempt of defects in its structure.

Another object of the invention is to provide an improved process for winding an ultra-thin strip borne by a support strip, whereby said ultra-thin strip is freed from its support by means of two lengthwise cuts effected during the winding, on each side, near the edge, the winding of the ultra-thin strip being achieved by pulling on the support strip now separated from the ultra-thin strip, which itself is not subject in the process to any mechanical strain liable to damage it.

The invention will now be described in detail with reference to the accompanying drawings in which:

FIGURE 1 shows large-scale transversal sections of the metal-coated ultra-thin strip according to the invention, at the various steps of its manufacture;

FIGURE 2 is a schematic representation of an apparatus for performing the process of the invention;

FIGURE 3 is a schematical representation of a machine combining several apparatus of FIGURE 2 and adapted for manufacturing condensers;

FIGURE 4 is a transversal cross-section of a first embodiment of a condenser;

FIGURE 5 is a transversal cross-section of a second embodiment of a condenser;

FIGURE 6 is a view of a part of the machine of FIGURE 3;

Figure 7:
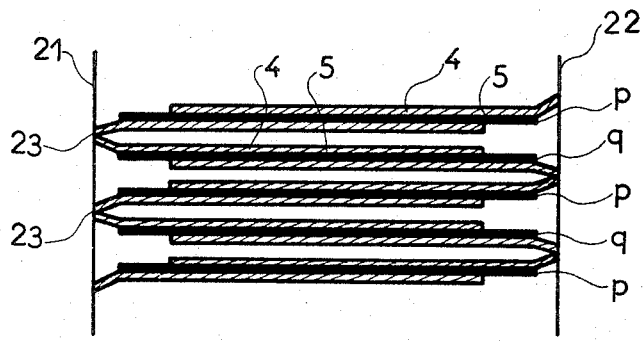
FIGURE 7 is a longitudinal section of a condenser of the invention.

In FIGURE 1(a), the reference numeral 1 denotes a strip made of paper or material having similar mechanical characteristics and comparable adherence with a lacquer, serving as an auxiliary support for a strip 2 of Mylar (polyethylene terephthalate) or a similar synthetic material such as the materials used for the sound recording tapes, serving as a support for the ultra-thin layer 3, FIGURE 1(b), which may, for instance, be made of polycarbonate or other lacquer having similar properties.

While the materials for elements 1, 2 and 3 may be selected from any of those suggested and others of like kind, the materials making up the layers 2 and 3 must be chosen so that they have mutual adherence characteristics much lower than the mutual adherence characteristics of the material of layer 2 and that of layer 1. The strips 1 and 2 have a thickness of the order of 4 to 20 microns; this thickness is in no way critical since these strips are eliminated from the final product. The reference numerals 4 and 5 denote two metallic layers deposited, for example, by using the method of vacuum evaporation.

The adherence of the polycarbonate on the porous paper is rather good; and, on the non-porous Mylar, it is poor. This important relationship will be utilized in the process of the invention, as will be seen more clearly as this description proceeds.

The layer of lacquer 3, for instance, of polycarbonate, supported by the Mylar, as shown in FIGURE 1(b), is deposited by any known process; for instance, a polycarbonate solution may be applied with an "inking" roller. The polycarbonate covers the outer face 3 of the Mylar as well as the edges 3' of the paper. The process parameters are adjusted so that the thickness of the lacquer layer may be 1 micron, for instance, and not more than three microns.

The Mylar strip 2 is then removed from the paper 1 so as to obtain a composite band of Mylar covered with an ultra-thin layer of polycarbonate 3, as seen in FIGURE 1(c). Removal of the layers 2–3 may be carried out by cutting the edges 3' of the layer 3.

As seen in FIGURE 1(d), a metallic layer 4 is then deposited onto the polycarbonate surface of the composite band, for instance, by vacuum deposition. For particular purposes, especially in the case of manufacture of condensers, it is advantageous to provide on the polycarbonate surface of the composite band a lateral margin exempt of metallic coating. In such case a margin is provided on the left-hand side of the element (FIGURE 1(d)).

The composite strip coated with the metal layer 4 is then applied to a strip 1', as in FIGURE 1(e), the metallic layer 4 being in contact with the surface of the strip 1' which is made of paper or a material having similar mechanical characteristics and a comparable adherence with a lacquer.

The free face of the Mylar as well as the free lateral margins of the paper are then covered, as in FIGURE 1(f), with a layer 3a of a lacquer which may be also a polycarbonate. The polycarbonate runs along the edges of the paper and forms fillets 3a' which ensure the adherence between the edges of the layer 3, the Mylar strip and the margins of the paper strip 1'. However, owing to the choice of materials, as indicated above, the attachment between the Mylar strips and the layer 3 is weaker than the attachment between the layer 3 and the strip 1'. This is necessary so as to make possible the removal of Mylar strip 2 and layer 3a without disturbing layer 3 in the composite construction.

The Mylar strip is removed by cutting or tearing the attachment binding layers 2 and 3a at the fillets 3a' and separating the Mylar strip 2 with its layer of lacquer 3a seen in FIGURE 1(g) from the paper strip bearing the ultra-thin strip 3 attached by the fillets 3a' seen in FIGURE 1(h), the metal coating 4 being preserved between the lacquer and the paper.

It is to be noted that attachment of the composite band by means of the layer 3a, mentioned above, may be carried out without depositing a layer of lacquer 3a across the entire surface of the Mylar strip, since only the provision of lateral attachments is necessary. Thus, the lacquer may be deposited in bands covering the marginal edges of the composite band. However, provision of a layer of lacquer covering the whole surface of the Mylar strip is recommended in order to be able to reuse the Mylar strip with its lacquer layer 3a in a new manufacturing cycle which will therefore start at step (c), that is, the lacquer layer 3a will become in the new cycle the lacquer layer 3.

In FIGURE 1(j), the free face of the lacquer 3 is covered with a metallic layer 5, leaving a margin disposed adjacent an edge opposite that associated with the margin provided by the metallic layer 4, i.e., on the left-hand side in the case of the figure.

In the next step in FIGURE 1(k), two cutting elements schematically represented by elements 6 and 7 are used to cut the attachment binding the lacquer layer 3 with the paper strip 1'. The cutting elements 6 and 7 may be cutting-wheels or cutting blades or any other conventional cutting means.

Cutting elements may be used to cut only the above-mentioned attachment (step (k) of FIGURE 1) or to cut also the margins 1b and 1c of the strip 1' thus leaving a central part 1a, the width of which is equal to that of the composite strip formed by layers 3, 4 and 5 (step (m) FIGURE 1). The composite band has no adherence to the central strip 1a but is supported by the latter in such a manner that no mechanical strain is exerted on the composite strip alone.

Further, the strip 1a and the strip, 3, 4, 5 are separated as shown in (n) of FIGURE 1, the separation not causing any damage to the strip 3, 4, 5 owing to the fact that there is no adherence between the metallic layer 4 and the paper layer 1a.

In order to avoid any mechanical strain for the band 3, 4, 5 the separation is preferably carried out by winding the band on a mandrel or reel, the surface of which is in contact with the layer 5 of the assembly 1a, 3, 4, 5, the strip 1a being further coiled on an appropriate mandrel, as will be described more fully in connection with the apparatus for performing the process.

The apparatus for performing the process described above has been schematically illustrated in FIGURE 2. The apparatus comprises three functional parts:

A first part I comprises conventional means for feeding a band such as that illustrated in FIGURE 1(e) that is comprising a first band 2 made of insulating material, a first lacquer layer 3, a first metallic layer 4 and a second insulating band 1'. The means represented by I may include conventional means for performing the process of the invention as described in connection with parts (a), (b), (c) and (d) of FIGURE 1.

A second part II of the apparatus comprises a plurality of guiding means, such as rollers F for guiding the band to a device G providing means for depositing a lacquer layer on the layer 2 of the band 1', 4, 3, 2. The device G may be arranged to deposit either a plain layer of lacquer such as the lacquer layer 3a–3a' illustrated in (j) of FIGURE 1 or two parallel bands forming the lateral attachments described above. Reel H is disposed adjacent device G and arranged to remove the band 2–3a from the composite construction. Cutting means (not illustrated) may be associated with the reel H for cutting the above-mentioned attachment securing the edges of the band 2–3a with those of the assembly 1', 4, 3. The second part of the apparatus further comprises an apparatus A, for depositing a metal layer 5 and cutting means J arranged to cut the attachment of the assembly 4, 3, 5 at the strip 1'. This cutting means J may be arranged to cut at the same time the margins 1b and 1c of the strip 1' (as illustrated in (m) of FIGURE 1).

A third part III of the apparatus comprises guides F' which are arranged to support the assembly 1', 4, 3, 5 and to tension the strip 1' which is further wound on take-up reel K. Mandrel L associated with guides F' is arranged to carry out the winding of the composite band 4, 3, 5 without exerting any stress on this band while maintaining a certain pressure or tension thereon. For example, the mandrel L is disposed so that its outer surface will be in constant contact with the part of the strip 1' disposed between the guides F'. In order to increase this tension, the strip 1' is preferably driven by the take-up reel K, the rollers F' and F and being freely mounted but slightly braked.

FIGURE 3 is a schematic representation of a machine combining several apparatus illustrated in FIGURE 2. This machine is especially adapted for producing coils made of several metal coated insulating bands wound together and more particularly for producing coiled-type condensers.

The exemplary combination illustrated in FIGURE 3 comprises two apparatus of FIGURE 2—each apparatus comprises the parts I, II but the part III of each apparatus have been arranged in a single part IV comprising the elements K and F' of each apparatus but only one common mandrel L, thus the bands formed by the layers 4, 3, 5 of each apparatus are wound together in a same reel L. Each assembly I, II may or may not include the element A, the combination being arranged to produce either coils with bands with a single metallic coating or a double metallic coating.

In the case where the bands have only one metal coating the assemblies I, II may be arranged to produce coils like that illustrated in FIGURE 4 (alternate insulation and metal layers). In the case of double metallic coatings, the obtained coil is illustrated in FIGURE 5.

A part of an embodiment of the part IV has been illustrated in greater detail in FIGURE 6. In order to obtain capacitors having the largest possible capacitance per unit volume, it is preferable to use two double coating bands, the metallicized sides of which each have an uncoated margin, as illustrated in (n) of FIGURE 1.

In FIGURE 6 the band 51, fed by the assembly I, II (FIGURE 3), comprises the auxiliary band 1' supporting the assembly of layers 4, 3, 5 attached to the band 1' by the attachments 3a'. The cutting device J comprises a reel 54 associated with cutting wheels 56 and 56' mounted on an axle 57. The cutting wheels cut the edges 1a–1c and the attachment 3a' along the dotted lines 53 and 53'.

The left-hand side scrap is wound in the direction of the arrow 65 on a reel 55 rotating in the direction of the arrow 66. Likewise, the right-hand side scrap is wound on a reel 55'. The strip 58, now made up of the paper strip covered by the metal-coated lacquer layer without adherence passes on the reel 59, corresponding to the first roller F' of FIGURE 3. The lacquer strip with its two metal coatings, which forms the upper part of the strip 58, is wound on the mandrel 69 (corresponding to L of FIGURE 3) in order to make up a part of a capacitor. As for the paper strip, it passes on the reel 60 (second roller F' of FIGURE 3) and is drawn following the arrow 67 by the take up reel 62 which is motor-driven and rotates according to the arrow 68.

In FIGURE 6 the second apparatus has been illustrated only by the element 73 which corresponds to the roller Fa' of FIGURE 3.

A second strip 71 identical to the strip 58 but bearing the metal-coated lacquer layer on its underface and having reversed metal-coating margins, goes with its metal-coated lacquer strip to make another part of the winding of the capacitor 69, the paper 74 passing then on the roller 73. So as not to overdraw the figure, the other equipment illustrating the processing of the various layers of the second strip 71 have not been shown but it is to be understood that said second strip is processed exactly in the same manner as the first strip 51, with the help of identical mechanical equipment.

The above-mentioned transfer-to-auxiliary-support (for instance, paper) and edges-cutting process also applies in the case of a lacquer strip with only one metal coating.

With reference to known processes, it offers the following advantages:

(1) It enables carrying out the separation of the ultra-thin layer from its support under well-controlled and perfectly reproducible conditions.

(2) No load is exerted on the dielectric at the time of winding.

As mentioned above, the making of a wound capacitor with strips according to the invention entails preferably the use of two strips in which the margin alternation is inverted. This arrangement is illustrated in FIGURE 7, which shows a section of a few turns of a capacitor wound with two strips according to the invention, a strip p having the upper margin on the left-hand side and the lower margin on the right, and a strip q having the upper margin on the right and the lower margin on the left. The connections of the plates of the capacitor are denoted by 21 and 22. In 23 are shown the interstitial air gaps. It is to be noted that, in all cases, the metallic layers surrounding an air gap are at the same voltage; consequently, the air gap capacitance plays no part in determining the capacitance of the capacitor.

As a result, a capacitor wound with strips according to the invention, with a thickness not exceeding 1 micron and with a double metal coating, and so designed as to make the capacitance of the air gaps null, has a capacitance per unit volume which exceeds by far that of the wound capacitors of known prior art.

Figure 8:
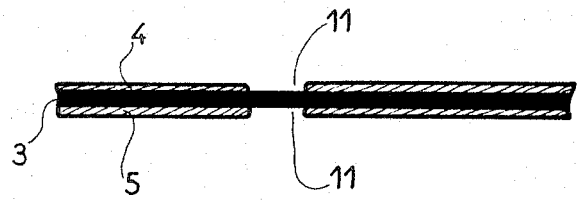
FIGURE 8 is a longitudinal section of a portion of a strip of a condenser of FIGURE 5.

In order to prevent the occurrence of short circuits between the metallic layers, at the level of the cutting, the metal coating is interrupted on at least one face at regular intervals, for instance, on a length of 3 mm. every 10 centimeters. This is illustrated in FIGURE 8 which shows a longitudinal section of a piece of a strip, the reference numerals denoting the same items as above. When making a cut at the level of an interruption of the metal coating 11, no short circuit will be produced. The result will be a sufficient definition of the strip length and a reduction of capacitance which is negligible.

We claim:

1. Method of manufacturing an ultra-thin insulating band coated by at least one metallic layer, comprising: coating a first insulating band on one side thereof with a first lacquer layer and depositing a first metallic layer on the free face of said first lacquer layer, applying the obtained band metal face down upon a second insulating band made of a material having high adherence characteristics with said lacquer, securing the lateral edges of said first lacquer layer to the lateral edges of said second band, the metallic layer being in contact with the second band, by attaching means having an attachment strength higher than the adherence of said first lacquer layer to said first insulating band and disposed along said lateral edges, removing said first insulating band, said first lacquer layer remaining attached to said second band owing to the relatively weak adherence of the lacquer to the first band, and removing the second band by eliminating said attachment.

2. The method according to claim 1, wherein the attachment of the first lacquer layer to the second band is carried out by depositing a layer of a second lacquer along the lateral edges of said bands and layers, said second lacquer having high adherence characteristics with said first lacquer and said second band but having relatively low adherence characteristics with said first band.

3. The method according to claim 2, wherein said second lacquer is the same as the first lacquer.

4. The method according to claim 1, wherein the second band is made wider than the first band, and the lateral edges of said first lacquer layer and of said second band are secured together by depositing a second layer of lacquer on the outer surface of the first band, said second layer of lacquer overlapping said first band in such a manner that the lateral edges of the second layer of lacquer overlap the edges of the first band and are deposited on lateral margins of the second band, the first band being removed thereafter with the second lacquer layer.

5. The method according to claim 4, wherein said first band and said second lacquer layer are removed by cutting the lateral margin of the second lacquer layer, the second band being then removed by cutting the lateral margins of the second lacquer layer still adhering to the first lacquer layer and to the second band.

6. The method according to claim 4, wherein a second metallic layer is deposited on the outer side of the first lacquer layer after the removal of the first band.

7. The method according to claim 4, wherein the cutting of the attachment of said first layer with said second band comprises simultaneous cutting of the lateral margins of the second band.

8. The method according to claim 7, wherein the obtained composite tape comprising the first lacquer and a metallic layer, is wound on a reel while removing the second band, said reel being closely adjacent to the separation line between said composite tape and the second band so as to avoid any longitudinal stress applied to the tape.

9. The method according to claim 1, wherein a second metallic layer is deposited on the outer side of the first lacquer layer after the removal of the first band.

10. The method according to claim 9, wherein the second metallic layer is deposited by the vacuum evaporation method.

11. The method according to claim 9, wherein the first metallic layer is deposited only on a part of the surface of the first lacquer layer, leaving a longitudinal margin without metallic coating, said second layer being deposited on only a part of the surface of the lacquer layer, leaving a longitudinal margin without metallic coating, the latter margin being disposed on the other side with respect to the longitudinal axis of the lacquer layer.

12. The method according to claim 1, wherein the first band comprises a thin film of a synthetic resin.

13. The method according to claim 12, wherein the first band is made of polyethylene terephthalate.

14. The method of claim 1, wherein the first lacquer layer is a polycarbonate.

15. The method according to claim 1, wherein the second band is made of paper.

16. The method according to claim 1, wherein the obtained composite tape including the first lacquer layer and a metallic layer, is wound on a reel while removing the second band, said reel being closely adjacent to the separation line between said composite tape and the second band so as to avoid any longitudinal stress applied to the tape.

17. Method of manufacturing an ultra-thin insulating band coated at both sides by thin metallic layers, comprising:
    application of a first thin lacquer layer on a first auxiliary band,
    application of a first metallic layer on said lacquer layer,
    applying the metallicized surface of the obtained band upon a second insulating band having a greater width, in such a manner that two lateral margins of the second band are not covered by the first band,
    securing the lateral edges of said first lacquer layer to the margins of said second band by an attachment made of a lacquer having higher adherence characteristics with the material of the second band and the first lacquer layer than the adherence characteristics of the first lacquer layer with the first band,
    removing said first band, said first lacquer layer and first metallic layer remaining attached to the second band owing to the relatively low adherence characteristics of the material of the first band with the lacquer of the first layer,
    applying a second metallic layer onto the outer surface of the first lacquer layer,
    cutting said attachment and said margins of the second band along the edges of the first lacquer layer in such a manner that said first lacquer layer is no longer secured to the second band,
    removing the second band by winding it on a first reel while the composite tape formed by the first lacquer layers and the metallic layers is wound on a second reel, said first reel disposed closely adjacent to the separation line between the second band and said composite tape.

18. The method according to claim 17, wherein said first lacquer layer is made of a polycarbonate, said first band of polyethylene terephthalate, and said second band of paper, said metallic layers being deposited by a vacuum evaporation method.

References Cited

Bell Labs. Record, vol. 33, No. 12, December 1955, pp. 441–444, P.O. Scientific Library TK–1B–432.

WILLIAM I. BROOKS, *Primary Examiner.*